United States Patent [19]
Tung et al.

[11] Patent Number: 6,042,402
[45] Date of Patent: Mar. 28, 2000

[54] PUSH BUTTON STRUCTURE FOR A CARD CONNECTOR

[75] Inventors: Shun-Chi Tung, Tu-Chen; Hung-Chi Yu, Taipei Hsien, both of Taiwan

[73] Assignee: Hon Hai Precision Ind. Co., Ltd., Taipei Hsien, Taiwan

[21] Appl. No.: 09/089,887

[22] Filed: Jun. 3, 1998

[30] Foreign Application Priority Data

Jun. 5, 1997 [TW] Taiwan .................................. 86209402

[51] Int. Cl.⁷ .................................................. H01R 13/62
[52] U.S. Cl. ............................................................ 439/159
[58] Field of Search ................................... 439/152, 159, 439/160

[56] References Cited

U.S. PATENT DOCUMENTS

| 5,443,395 | 8/1995 | Wang | 439/159 |
| 5,653,603 | 8/1997 | Sasao et al. | 439/159 |
| 5,730,610 | 3/1998 | Hsia et al. | 439/160 |

FOREIGN PATENT DOCUMENTS

| 82102557 | 4/1993 | Taiwan . |
| 82109139 | 10/1993 | Taiwan . |
| 83107162 | 10/1993 | Taiwan . |

Primary Examiner—Michael L. Gellner
Assistant Examiner—Barry M. L. Standig

[57] ABSTRACT

A push button structure for a card ejector mechanism of a card connector mounted in a portable computer comprises a first section fixed to a push rod of the ejector mechanism and a second section linearly movable and pivotably connected to the first section wherein the second section can be movably retained at first, second, and third positions relative to the first section. At the first position, the second section protrudes from a housing of the computer a sufficient distance so that a push force can be easily exerted on the push button structure. At the second position, the second section is pivoted relative to the first section to be substantially flush with an outside of the housing so that the push button structure will not be susceptible to damage by an external force. At the third position, the second section is pushed to engage with the first section so that a push force can be exerted on the push rod to activate a card ejecting plate to eject a card inserted into the card connector.

18 Claims, 9 Drawing Sheets

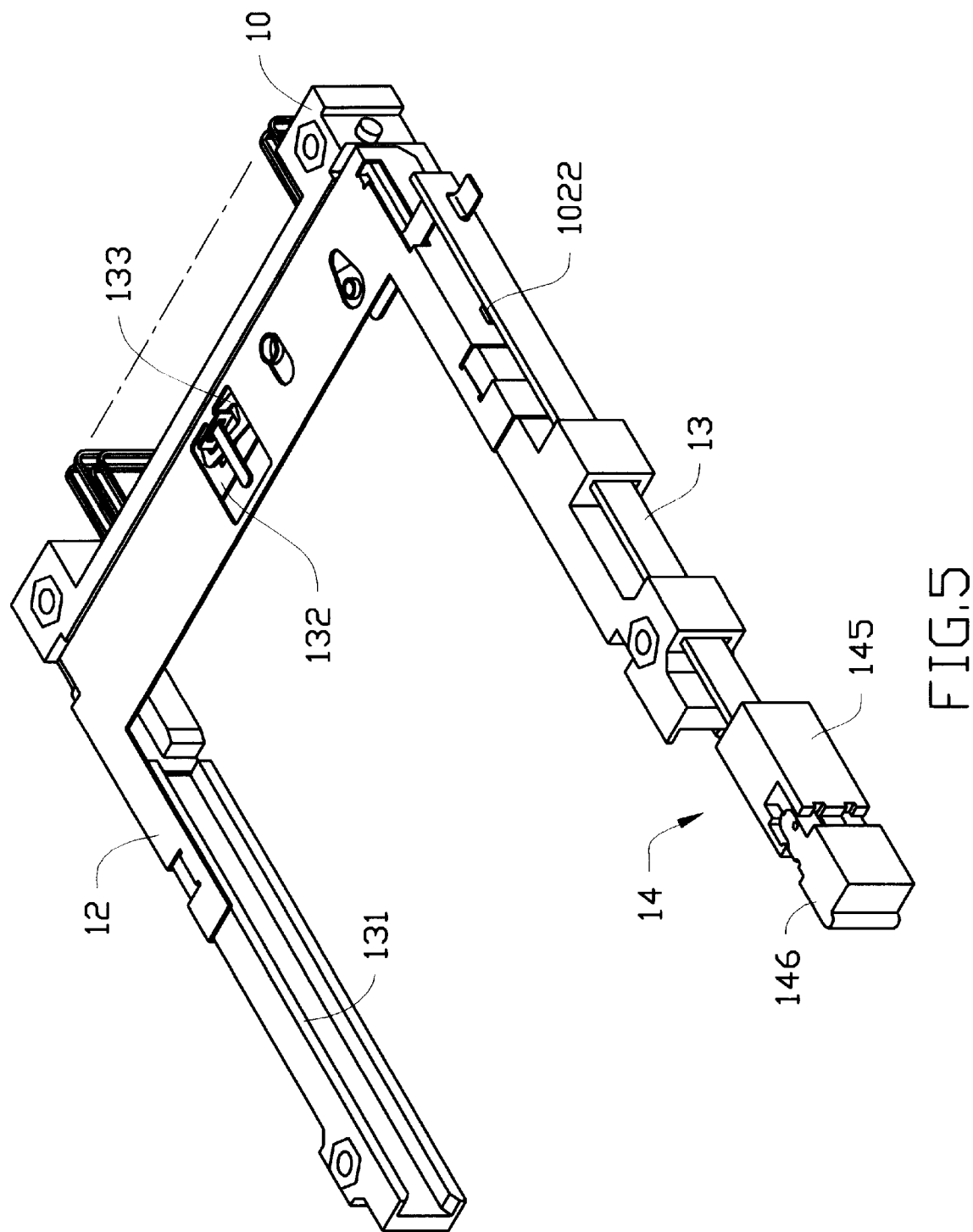

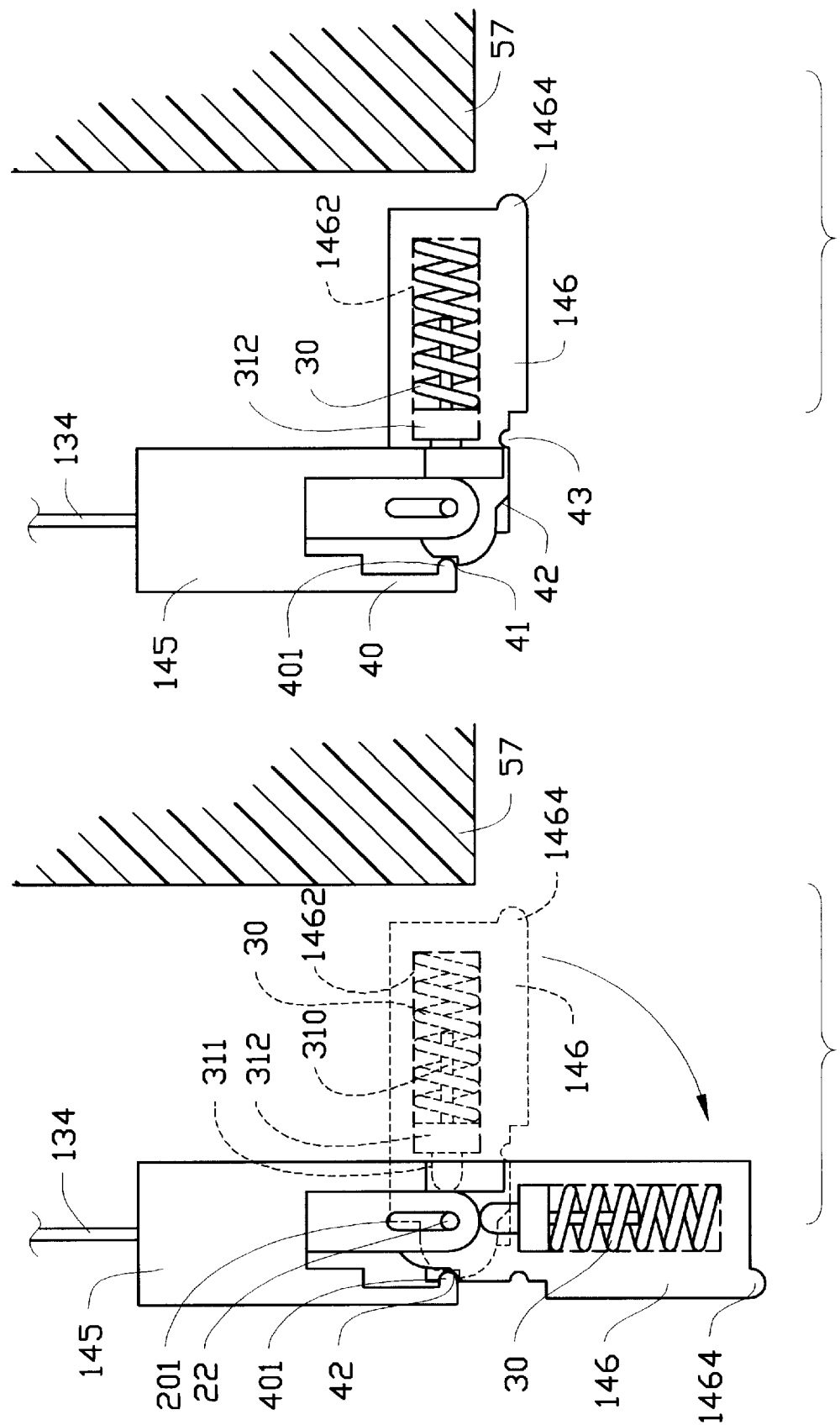

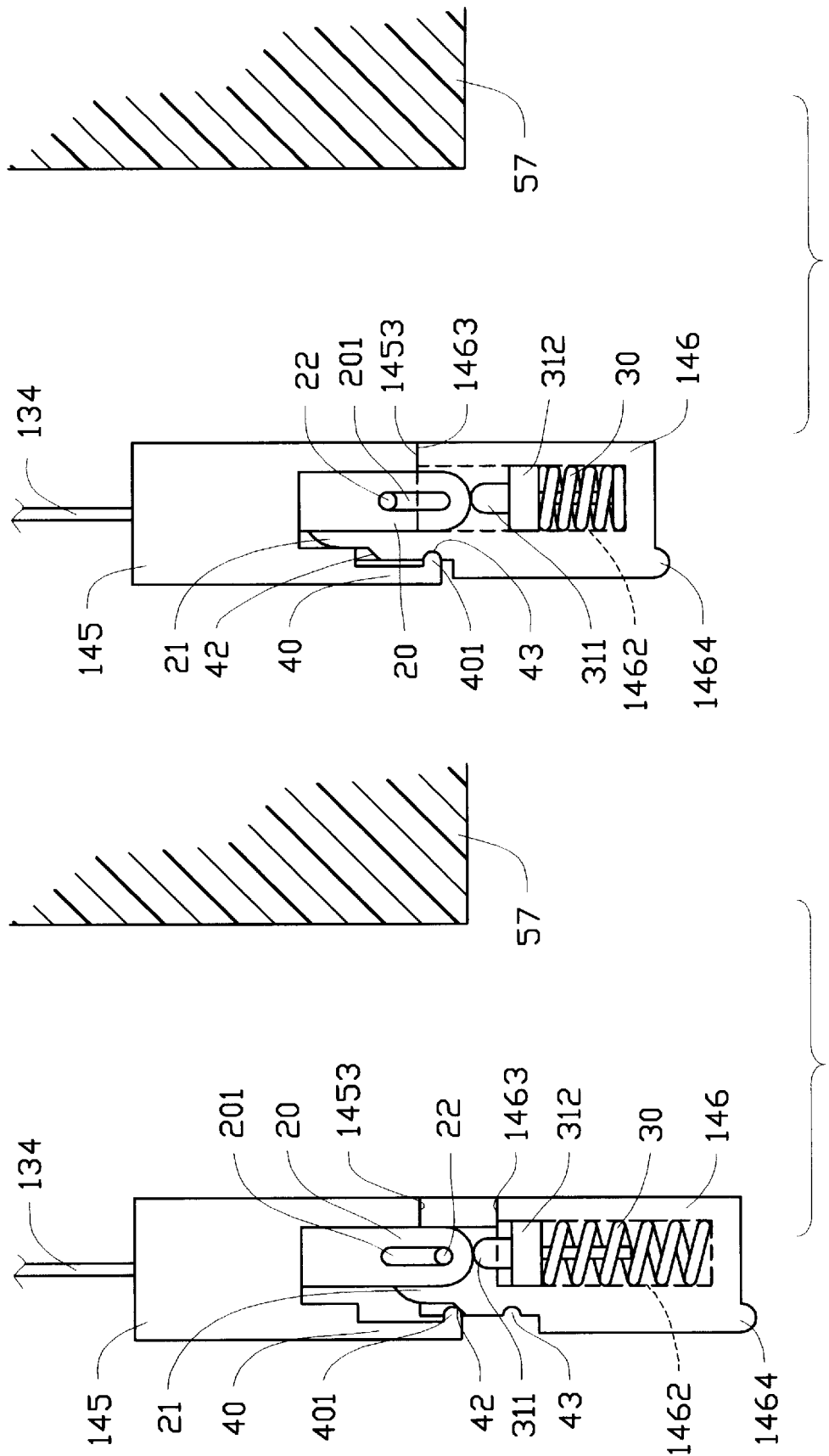

PUSH BUTTON STRUCTURE FOR A CARD CONNECTOR

BACKGROUND OF THE INVENTION

1. Field of The Invention

The present invention relates to a card connector, and particularly to a push button for a card ejector mechanism of a card connector which receives a push force to activate the card ejector mechanism and eject a card inserted into the connector.

2. The Prior Art

Portable computers (or laptop computers) are generally equipped with card connectors for receiving IC cards therein. U.S. Pat. Nos. 5,324,204, 5,383,789 and 5,421,737 and Taiwan Patent Application Nos. 82102557, 82109139 and 83107162 disclose a variety of card connectors each consisting of a connector and a card ejector mechanism for ejecting a card inserted into the connector by pushing a push button of the mechanism. The card ejector mechanisms of these conventional connectors have either of the following disadvantages: a push button thereof is always received in the computer thereby inhibiting access thereto which complicates ejection of an inserted card, or the push button protrudes from a housing of the computer a significant distance and therefore may become damaged by an external force which would render the entire card ejector mechanism inoperable.

Referring to FIG. 1, a card connector 2 generally consists of a connector 6 having a housing 60 interferentially mounting a number of contacts 601 and having two engaging arms 602 for engaging with a card guiding frame 5. A daughter board 62 is soldered to the contacts 601 for electrically connecting an inserted card (not shown) to a mother board (not shown). The guiding frame 5 generally consists of two longitudinal arms 50 connecting with a mounting plate 53. An ejector mechanism consists of a push rod 54 slidably mounted to one of the arms 50, a push button 501 fixed to one end of the rod 54 and an actuator 52 having a first end connected to the other end of the rod 54 and a second end connected to an ejecting plate 51 slidably mounted on the mounting plate 53. A shielding/grounding plate 64 is mounted to the housing 60 above the contacts 601. When no card is inserted into the connector 2, the push rod 54 together with the push button 501 is located at a front position as shown in FIG. 2(A). When a card 8 is inserted into the connector 2, the push rod 54 together with the push button 501 is displaced to a rear position as shown in FIG. 2(B) whereby a push force can be exerted on the push rod 54 via the push button 501 to pivot the actuator 52 which moves the ejecting plate 51 rearward to eject the inserted card 8.

The prior art as shown in FIGS. 1 to 2(B) discloses the push button 501 to be constantly located inside a housing 7 of a computer, which inhibits user access to the push button 501 to exert the ejecting force.

In another design, the push button protrudes a sufficient distance from the housing of the computer to receive the push force when a card is inserted into the connector. Although such a design can overcome the problem of the prior art of FIGS. 1 to 2(B), the protruding push button may become easily damaged by an external force.

Hence, an improved push button structure is needed to eliminate the above mentioned defects of conventional card connectors for portable computers.

SUMMARY OF THE INVENTION

Accordingly, an objective of the present invention is to provide a card ejector mechanism for a card connector of a computer having a push button which can be easily accessed and will not be susceptible to damage by an external force.

Another objective of the present invention is to provide a linearly movable and pivotable push button for a card ejector mechanism of a card connector which can be movably retained at three different operating positions so that a user can easily manipulate the push button.

To fulfill the above mentioned objectives, according to one embodiment of the present invention, a push button for a card ejector mechanism of a card connector has a first section fixed to a front end of a push rod of the mechanism and a second section linearly movable and pivotably connected to the first section to be movably retained thereon at three positions. The push rod is drivably connected to an ejecting plate of the mechanism so that when the rod is pushed rearward toward the card connector, a card received in the connector is ejected by the ejecting plate. The first section is formed with a first body fixed to the push rod, an engaging arm projecting forward from the first body and forming an engaging hook at a free end thereof, and a rail also projecting forward from the first body. The second section is formed with a second body and an ear projecting rearward from the second body. A first pin extends through the ear and the rail to fixedly engage with the ear and slidably engage with the rail. A spring is received in the second body. A second pin is pushed by the spring to constantly engage with the rail of the first section. At a first position, the second section is aligned with the first section and is spaced a distance therefrom, and the engaging hook engages with a step formed at a connecting portion between the ear and the second body. At a second position, the second section is pivoted to be perpendicular to the first section and the engaging hook engages with a step formed on a free end of the ear distanced from the second body. At a third position, the second section is aligned with and closely abuts the first section wherein the engaging hook engagably extends into a recess defined in the second body.

BRIEF DESCRIPTION OF THE DRAWINGS

FIG. 5 is a perspective view of the assembled card connector of FIG. 3;

FIG. 6(A) is a diagrammatic view showing the connector mounted in a computer where the push button is moved from the second position to the first position;

FIG. 6(B) is a view similar to FIG. 6(A) showing the push button at the second position;

FIG. 6(C) is a view similar to FIG. 6(A) showing the push button at the first position; and FIG. 6(D) is a view similar to FIG. 6(A) showing the push button at a third position just before pushing a push rod.

DETAILED DESCRIPTION OF THE PREFERRED EMBODIMENT

Reference will now be made in detail to the preferred embodiment of the present invention.

Figure 1:
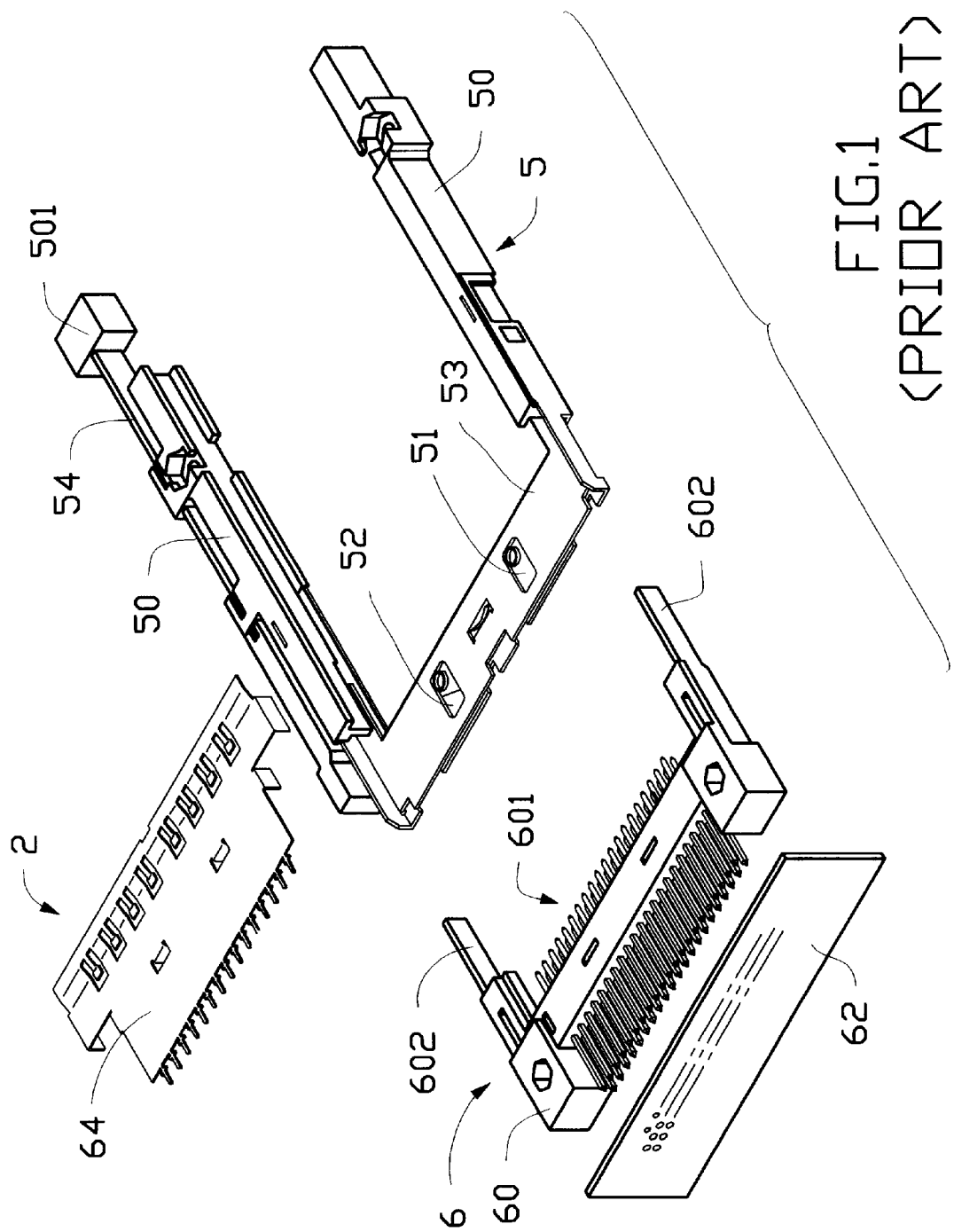
FIG. 1 is a perspective, exploded view of a prior art card connector.
Figure 2:
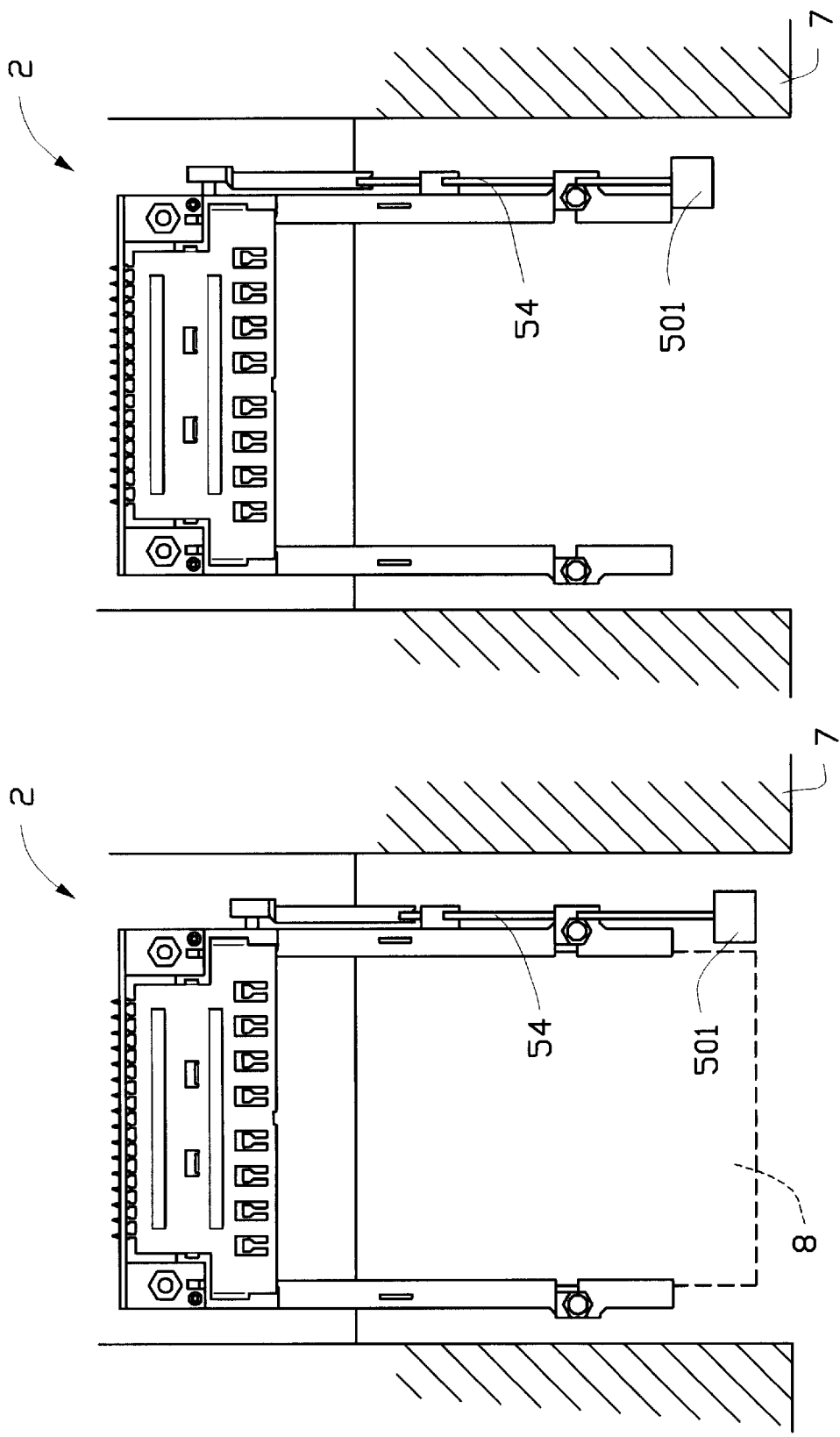
FIG. 2(A) is a diagrammatic view showing the connector of FIG. 1 mounted in a computer where no card is inserted into the connector.
FIG. 2(B) is a view similar to FIG. 2(B) with a card inserted into the connector.
Figure 3:
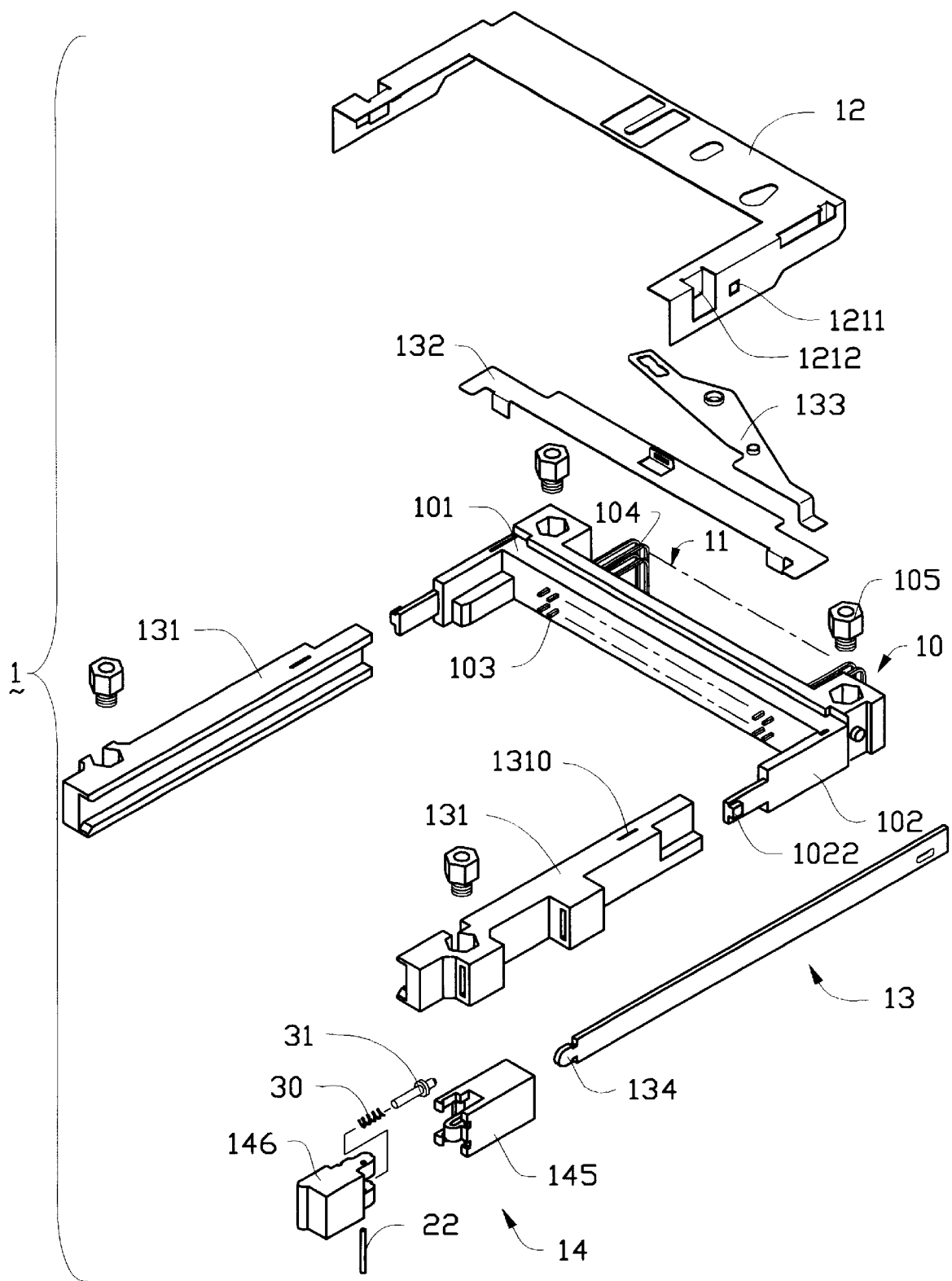
FIG. 3 is a perspective, exploded view of a card connector in accordance with the present invention.

Referring to FIG. 3, a card connector 1 in accordance with the present invention includes a connector 10 having a housing 101 interferentially receiving a number of contacts 11 each having a contact portion 103 for engaging with an inserted IC card (not shown), and a terminal portion 104 for connecting with a mother board (not shown). Two mounting arms 102 each form a key 1022 for fittingly engaging with a square hole 1211 defined in a mounting plate 12 which has two mounting tabs 1212 for interferentially fitting with two slits 1310 defined in two guiding arms 131 to fixedly connect the guiding arms 131 and the mounting plate 12 together. Four screws 105 are used to connect the card connector 1 to a stacked connector (not shown) or the mother board (not shown).

A card ejector mechanism includes a push button structure 14, a push rod 13, an actuator 133 and an ejecting plate 132. As the assembly of the guiding arms 131, the connector 10, the ejecting plate 132, the actuator 133, the mounting plate 12 and the push rod 13 is known by those skilled in the art and is not concerned with the inventive characteristics of the present invention, detailed descriptions thereof are omitted here. An assembly of the above mentioned components is shown in FIG. 5.

Figure 4A:
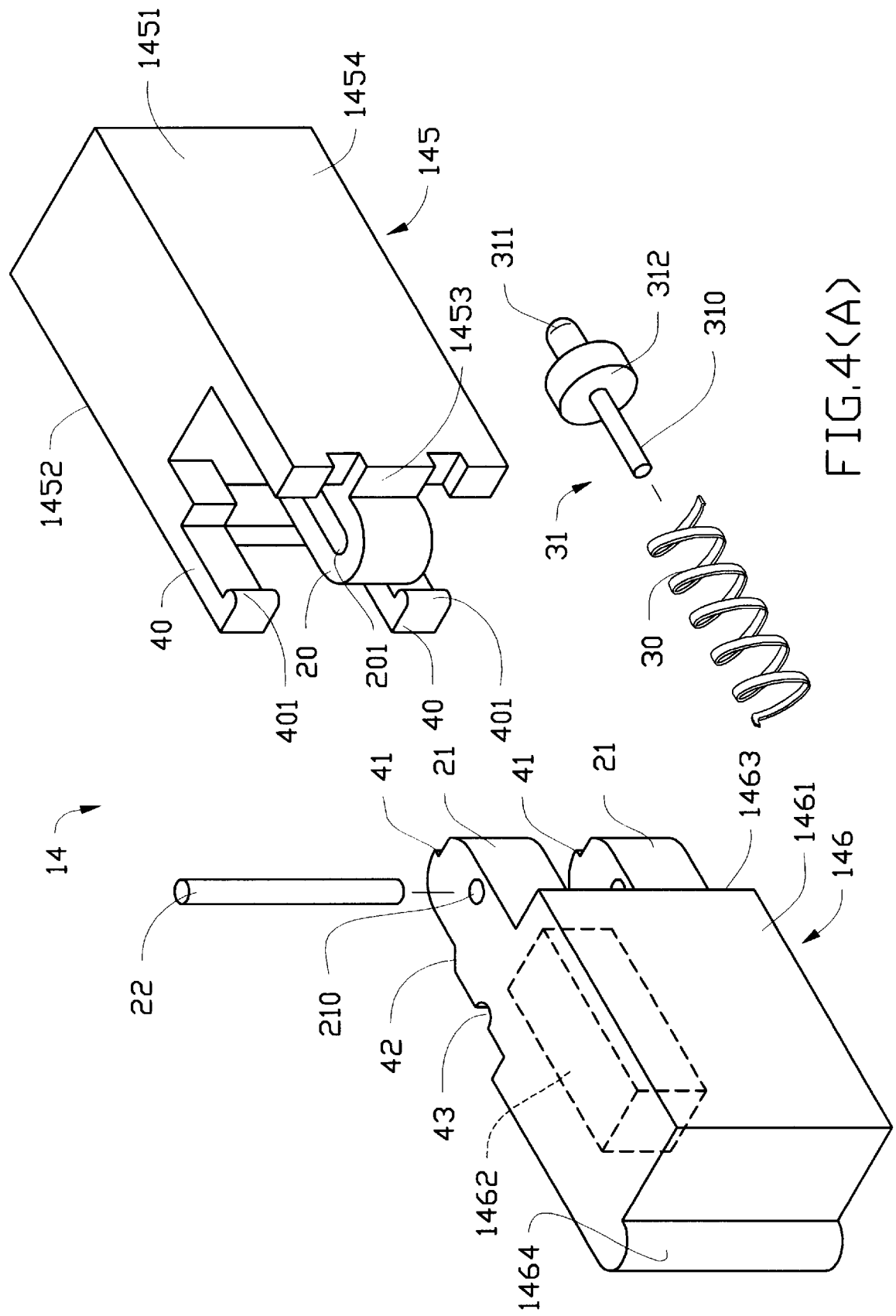
FIG. 4(A) is an enlarged perspective, exploded view of a push button of the card connector of FIG. 3.

Also referring to FIGS. 4(A) and 5, the push button structure 14 includes a first section 145 fixedly attached to a front end 134 of the push rod 13 which has a semi-circular configuration, and a second section 146 for being linearly movable and pivotably connected to the first section 145.

The first section 145 is formed to have a rectangular main body 1451, two elongate arms 40 respectively projecting forward from an upper and lower edge of a left side 1452 of the body 1451, a rail 20 projecting forward from a center of the body 1451, and a stop face 1453 defined by a front end of a right side 1454 of the body 1451. Each arm 40 has an engaging hook 401 at a free end thereof. The rail 20 defines an elongate slot 201 therein.

The second section 146 is also formed to have a rectangular main body 1461. Two mounting ears 21 respectively project rearward from upper and lower sides of the main body 1461, and a mounting hole 210 is vertically defined through each of the ears 21 near a right side thereof. A first engaging step 41 is defined by a free end of each of the ears 21 distanced from the main body 1461. A second engaging step 42 is defined by a connecting portion between the body portion 1461 and a left side of each of the ears 21, and an engaging recess 43 is formed in front of the second engaging steps 42. The push button structure 14 further includes a first pin 22, a helical spring 30 and a second pin 31 having a slender tail portion 310, an enlarged engaging head 311 and a flange 312 therebetween. A blind hole 1462 is formed in the main body 1461 between the ears 21 and has an opening exposed to a rear side 1463 of the main body 1461.

Figure 4B:
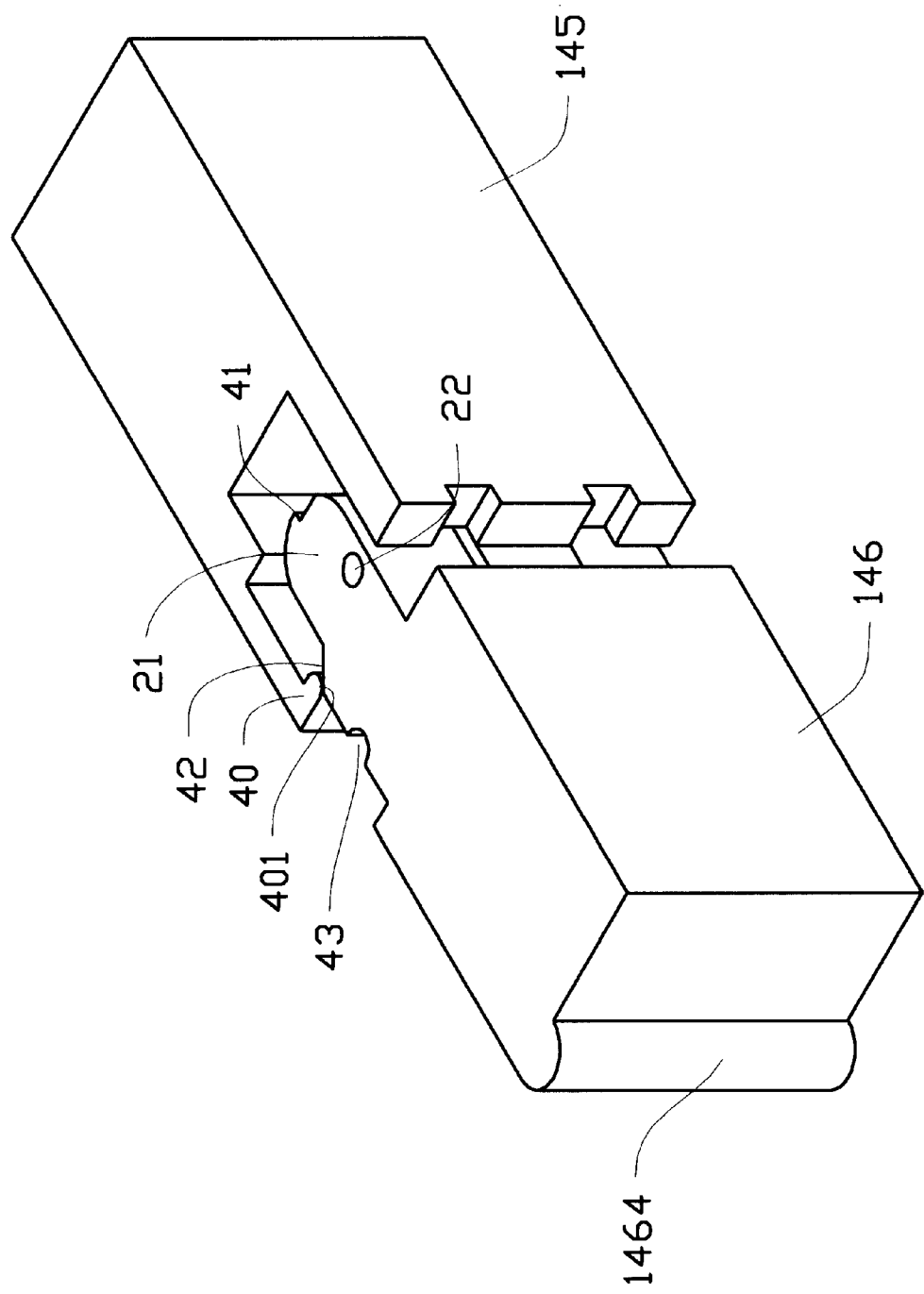
FIG. 4(B) is a perspective view of the assembled push button of FIG. 4(A) at a first position.

To assemble the push button structure 14, the spring 30 and second pin 31 are successively mounted into the blind hole 1462 to reach a position in which the tail portion 310 extends into the spring 30 and the flange 312 abuts against the spring 30. The rail 20 is then extended into a space between the ears 21 to reach a position as shown in FIG. 6(C) in which a front end of the slot 201 is in alignment with the holes 210 and the engaging head 311 of the second pin 31 abuts against a front end of the rail 20. Finally, the first pin 22 is inserted through the holes 210 and the slot 201 to fixedly engage with the ears 21 and slidably engage with the rail 20 wherein the engaging hooks 401 engage with the second steps 42 thereby movably retaining the second section 146 at the position as shown in FIGS. 4(B) and 5 and 6(C). Hereafter, this position is referred to as the "first position".

Figure 4C:
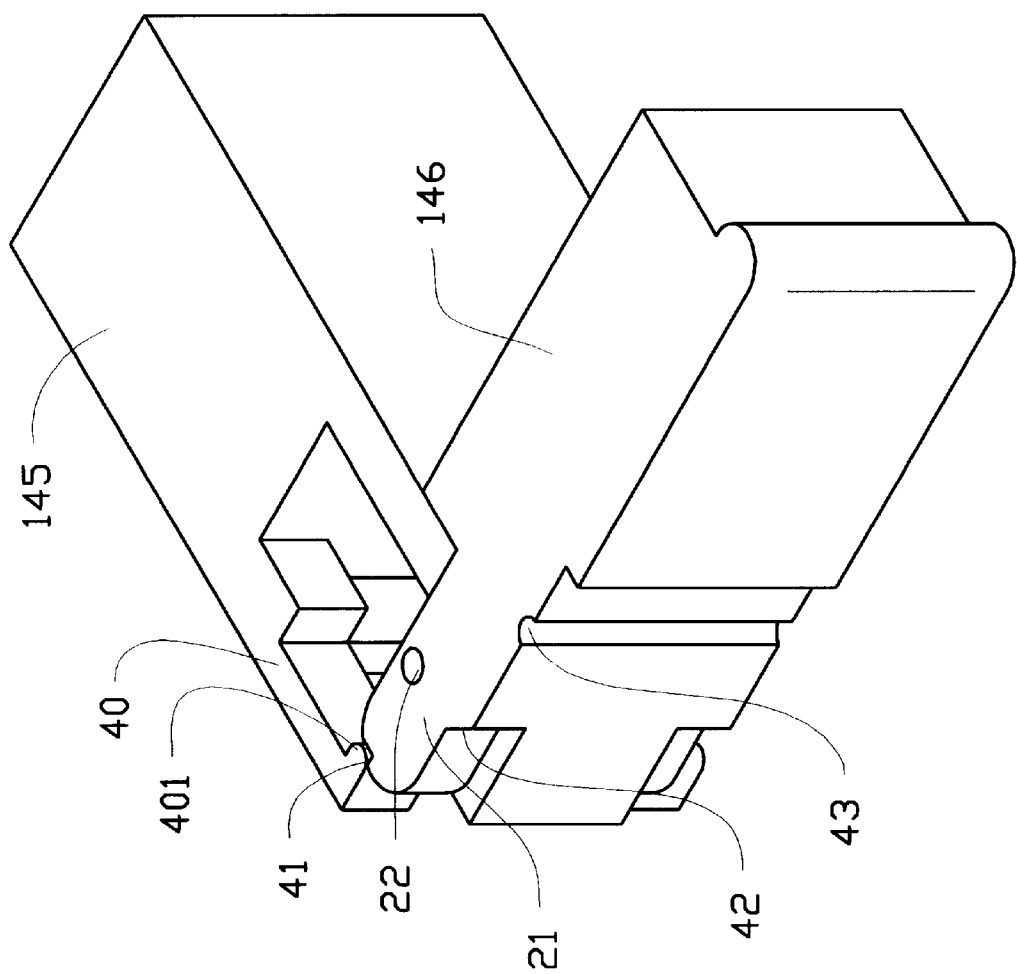
FIG. 4(C) is a perspective view of the assembled push button of FIG. 4(A) at a second position.

At the first position, the second section 146 of the push button structure 14 can be pivoted relative to the first section 145 about the first pin 22 to reach a position as shown in FIGS. 4(C) and 6(B), wherein the second section 146 is perpendicular to the first section 145. Hereafter, this position is referred to as the "second position". During movement of the push button structure 14 from the first to the second position, the engaging head 311 of the second pin 31 is in constant contact with an arc contour of the rail 20 to ensure smooth movement of the second section 146 between the first and second positions. At the second position, the rear face 1463 of the main body 1461 of the second section 146 engages with the right side 1454 of the main body 1451 of the first section 145 and the engaging hooks 401 engage with the first steps 41 so that the second section 146 can be movably retained at the second position.

Particularly referring to FIGS. 6(A) and 6(B), when the push button structure 14 is at the second position, the first section 145 is received in a housing 57 of a computer and the second section 146 is substantially flush with an outer surface of the housing 57 so that the push button structure 14 will not be susceptible to damage by an external force. When it is necessary to exert a push force on the push button structure 14, the second section 146 is pivoted relative to the first section 145 by motivating a handle portion 1464 of the second section 146 in a direction as shown by an arrow of FIG. 6(A) to reach the first position whereby the second section 146 protrudes from the housing 57 a sufficient distance so that a user can easily exert a card ejecting force on the push button structure 14.

When a push force is exerted on the push button structure 14 from the first position as shown in FIG. 6(C) to eject the inserted card, the second section 146 is first moved to a third position as shown in FIG. 6(D) in which the rail 20 extends into the blind hole 1462 to compress the spring 30, the rear face 1463 of the main body 1461 of the second section 146 engages with the stop face 1453 and the engaging hooks 401 engagably extend into the recess 43. Thereafter, the push force causes the push rod 134 fixedly connected with the first section 145 to move rearward toward the connector 10 to activate the ejecting plate 132 via the actuator 133 to move forward thereby ejecting the inserted card.

While the present invention has been described with reference to a specific embodiment, the description is illustrative of the invention and is not to be construed as limiting the invention. Various modifications to the present invention can be made to the preferred embodiment by those skilled in the art without departing from the true spirit and scope of the invention as defined by the appended claims.

We claim:

1. A push button structure for a card ejector mechanism of a card connector, said card ejector mechanism having an ejecting plate for ejecting a card inserted into the connector and a push rod for manipulating the ejecting plate, said push button structure comprising:

a first section adapted to be fixedly connected to the push rod, said first section comprising:
 a first body;
 an arm projecting from the first body and defining an engaging hook at a free end of the first body;

a second section linearly movable and pivotally mounted to the first section and movably retained on the first section at first, second and third positions by engaging the engaging hook with first, second and third portions of the second section, wherein at the first position, the second section is aligned with the first section and spaced from the first section a distance, at the second position, the second section is perpendicular to the first section, and at the third position, the second section is aligned with and abuts against the first section.

2. The push button structure in accordance with claim 1, wherein the first section is formed with a rail projecting from the first body toward the second section, and the second section is formed with a second body and an ear projecting from the second body toward the first section, said second section being linearly movable and pivotally mounted to the first section by extending a first pin through the ear and the rail to fixedly engage with the ear and slidably engage with the rail.

3. The push button structure in accordance with claim 2, wherein the second portion of the second section is a step defined at a free end of the ear distanced from the second body, the first portion of the second section is a step defined by a connecting portion located between the ear and the second body, and the third portion of the second section is a recess defined by the second body.

4. The push button structure in accordance with claim 2 further comprising a spring received in the second section and a second pin pushed by the spring to constantly contact with the rail.

5. The push button structure in accordance with claim 2, wherein the rail defines an elongate slot therein and the first pin extends through the elongate slot.

6. The push button structure in accordance with claim 2, wherein the first body defines a stop face and a side face beside and perpendicular to the stop face and wherein at the second position, the second body engages with the side face of the first body, and at the third position the second body engages with the stop face.

7. The push button structure in accordance with claim 6, wherein the first body has a substantially rectangular configuration, the arm projects from a left side of the first body and the stop face is located on a right side of the first body opposite the left side.

8. The push button structure in accordance with claim 7, wherein the rail is located between the left and right sides of the first body.

9. The push button structure in accordance with claim 2, wherein the second body is formed to have a substantially rectangular configuration, the third and first portions of the second section being located on a same side of the second body.

10. A card connector apparatus for a computer, comprising:

a connector having a body and a number of contacts fixed to the body;

a card guiding frame fixed to the connector for guiding a card into the card connector apparatus;

an actuator pivotally mounted to the body of the connector for ejecting a card inserted into the card connector apparatus;

a push rod having a rear end connected with the actuator and a front end;

a push button structure having a first section fixedly connected to the front end of the push rod, said first section comprising:

a first body;

an arm projecting forward from the first body and defining an engaging hook at a free end of the arm;

a second section linearly movable and pivotally mounted to the first section and movably retained on the first section at first, second and third positions by engaging the engaging hook with first, second and third portions of the second section, wherein at the first position, the second section is aligned with the first section, spaced from the first section a distance and protruding from a housing of the computer a sufficient distance, at the second position, the second section is perpendicular to the first section to be substantially flush with the housing, and at the third position, the second section is aligned with and closely abuts against the first section.

11. The card connector in accordance with claim 10, wherein the first section is formed with a rail projecting from the first body toward the second section, and the second section is formed with a second body and an ear projecting from the second body toward the first section, said second section being linearly movable and pivotally mounted to the first section by extending a first pin through the ear and the rail to fixedly engage with the ear and slidably engage with the rail.

12. The card connector in accordance with claim 11, wherein the second portion of the second section is a step defined at a free end of the ear distanced from the second body, the first portion of the second section is a step defined by a connecting portion located between the ear and the second body, and the third portion of the second section is a recess defined by the second body.

13. The card connector in accordance with claim 11 further comprising a spring received in the second section and a second pin pushed by the spring to constantly contact with the rail.

14. The card connector in accordance with claim 11, wherein the rail defines an elongate slot therein and the first pin extends through the elongate slot.

15. The card connector in accordance with claim 11, wherein the first body defines a stop face and a side face beside and perpendicular to the stop face and wherein at the second position, the second body engages with the side face of the first body, and at the third position the second body engages with the stop face.

16. The card connector in accordance with claim 15, wherein the first body has a substantially rectangular configuration, and the arm projects from a left side of the first body and the stop face is located on a right side of the first body opposite the left side.

17. The card connector in accordance with claim 16, wherein the rail is located between the left and right sides of the first body.

18. The card connector in accordance with claim 11, wherein the second body is formed to have a substantially rectangular configuration, the third and first portions of the second section being located on a same side of the second body.

* * * * *